United States Patent
Tortonese et al.

(10) Patent No.: US 7,301,638 B1
(45) Date of Patent: Nov. 27, 2007

(54) DIMENSIONAL CALIBRATION STANDARDS

(75) Inventors: Marco Tortonese, Mountain View, CA (US); Jerry Prochazka, Clayton, CA (US); Ellen Laird, San Jose, CA (US); Pat Brady, Livermore, CA (US); Rene M. Blanquies, San Jose, CA (US)

(73) Assignee: KLA Tencor, Inc., San Jose, CA (US)

( * ) Notice: Subject to any disclaimer, the term of this patent is extended or adjusted under 35 U.S.C. 154(b) by 699 days.

(21) Appl. No.: 10/770,151

(22) Filed: Jan. 31, 2004

(51) Int. Cl.
*G01N 21/84* (2006.01)

(52) U.S. Cl. .................................. 356/430; 356/243.1

(58) Field of Classification Search ............... 356/430, 356/243.4, 243.1, 339–401, 243.8; 438/14, 438/406; 250/205
See application file for complete search history.

(56) References Cited

U.S. PATENT DOCUMENTS

| | | | |
|---|---|---|---|
| 5,246,539 A * | 9/1993 | Canestrari et al. ............. | 216/2 |
| 5,534,359 A | 7/1996 | Bartha et al. ................ | 428/688 |
| 5,665,905 A | 9/1997 | Bartha et al. ................. | 73/105 |
| 5,684,301 A | 11/1997 | Cresswell et al. ........... | 250/306 |
| 5,914,784 A | 6/1999 | Ausschnitt et al. ......... | 356/624 |
| 5,920,067 A | 7/1999 | Cresswell et al. ........... | 250/306 |
| 5,955,654 A | 9/1999 | Stover et al. ................ | 73/1.89 |
| 5,960,255 A | 9/1999 | Bartha et al. ................ | 438/14 |
| 5,969,273 A | 10/1999 | Archie et al. .............. | 73/865.8 |
| 6,016,684 A | 1/2000 | Scheer et al. ................ | 73/1.89 |
| 6,128,089 A | 10/2000 | Auschnitt et al. ........... | 356/401 |
| 6,646,737 B2 | 11/2003 | Tortonese et al. ........ | 356/243.4 |
| 2003/0058437 A1 | 3/2003 | Tortonese et al. ........ | 356/243.4 |

OTHER PUBLICATIONS

Allen et al., "Sheet and Line Resistance of Patterned SOI Surface Film CD Reference Materials as a Function of Substrate Bias," 1999, in *Proceedings if the IEEE 1999 Conference one Microelectronic Test Structuers.* vol. 12, Mar. 1999. pp. 51-55.

Allen et al., "Evaluation of Surface Depletion Effects in Single-Crystal Test Structures for Reference Materials Applications," in *Characterization and Metrology for ULSI Technology: 1998 International Conference.* 1998, pp. 357-362., American Institute of Physics, College Park, MD.

(Continued)

*Primary Examiner*—Gregory J. Toatley, Jr.
*Assistant Examiner*—Tri Ton
(74) *Attorney, Agent, or Firm*—Joshua D. Isenberg; JDI Patent

(57) ABSTRACT

A calibration standard, for calibrating lateral or angular dimensional measurement systems, is provided. The standard may include a first substrate spaced from a second substrate. The standard may be cross-sectioned in a direction substantially perpendicular or substantially non-perpendicular to an upper surface of the first substrate. The cross-sectioned portion of the standard may form a viewing surface of the calibration standard. The standard may include at least one layer disposed between the first and second substrates. The layer, or a feature etched into the first or second substrate or a feature etched into the layer may have a traceably measured thickness or may be oriented at a traceably measured angle with respect to the viewing surface. A thickness or angle of the layer or other feature may be traceably measured using any technique for calibrating a measurement system with a standard reference material traceable to a national testing authority.

41 Claims, 6 Drawing Sheets

OTHER PUBLICATIONS

Allen et al., "Comparison of Properties of Electrical Test Structures Patterned in BESOI and SMOX Films for CD Reference-Material Applications," SPIE vol. 3332, 1998, pp. 124-131.

UCSB College of Engineering Press Release : "Researchers Discover How to Make the Smallest, Most Perfect, Densest nanowire Lattices—And It's a SNAP", Mar. 13, 2003, http://www.engineering.ucsb.edu/Announce/nanowire.html/.

Cresswell et al. "Electrical Linewidth Test Structures Fabricated in Monocrystalline Films for Reference-Material Applicaitons", 1998, pp. 182-193.

MAG★I★CAL® DELUXE, A Magnicication Calibration Sample for Transmission Electron Microscpes, from http://www.emdiasum.com/ems/calibration/magical.html, Nov. 14, 2003.

US 5,841,144, 11/1998, Cresswell (withdrawn)

* cited by examiner

DIMENSIONAL CALIBRATION STANDARDS

FIELD OF THE INVENTION

This invention generally relates to the field of metrology and more particularly to dimensional calibration standards and methods of manufacture and use.

BACKGROUND OF THE INVENTION

As the dimensions of semiconductor devices continue to shrink with advances in semiconductor materials and fabrication processes, monitoring and controlling semiconductor fabrication processes by lateral dimensional metrology has become increasingly important in the successful fabrication of advanced semiconductor devices. Currently available systems for lateral dimensional metrology may be configured to perform techniques such as optical, electron beam, ion beam, atomic force, and scanning probe microscopy. In addition, lateral dimensional metrology systems may also perform an electrical metrology technique, e.g., by measuring the resistance of a feature of a known material and determining a cross-sectional area and/or a linewidth of the feature from the measured resistance.

Calibration standards are often used to calibrate lateral dimensional metrology systems. A calibration standard may include features such as lines and/or spaces having a certified lateral dimension. Currently available linewidth calibration standards may have a lateral dimension artifact of approximately 500 nm to approximately 30,000 nm. Such calibration standards may be formed, e.g., by semiconductor fabrication processes such as lithography and etch. Such lithography and etch processes may produce features having a lateral dimension of greater than about 50 nm. As such, a minimum lateral dimension of calibration standards formed by current lithography and etch processes may be limited by a performance capability of such processes and systems. Consequently, lateral dimensional metrology equipment may be calibrated at a minimum lateral dimension substantially greater than a lateral dimension of features formed by advanced semiconductor fabrication processes. Lateral dimensional metrology equipment, therefore, may have limited usefulness for monitoring and controlling advanced semiconductor fabrication processes.

Several calibration methods for lateral dimensional metrology equipment, however, have been developed for use with currently available calibration standards to expand the usefulness of such equipment for advanced processing applications. Examples of such methods are illustrated in U.S. Pat. Nos. 5,914,784 to Ausschnitt et al., 5,969,273 to Archie et al., and 6,128,089 to Ausschnitt et al., and are incorporated herein by reference. Such methods, however, may include indirectly determining a location of an edge of a feature, which may subject the resulting calibration to substantial inaccuracy. In addition, these techniques do not address calibration of metrology systems for measuring angular features such as sidewall angles.

BRIEF DESCRIPTION OF THE DRAWINGS

Other objects and advantages of the invention will become apparent upon reading the following detailed description and upon reference to the accompanying drawings in which.

Figure 1:
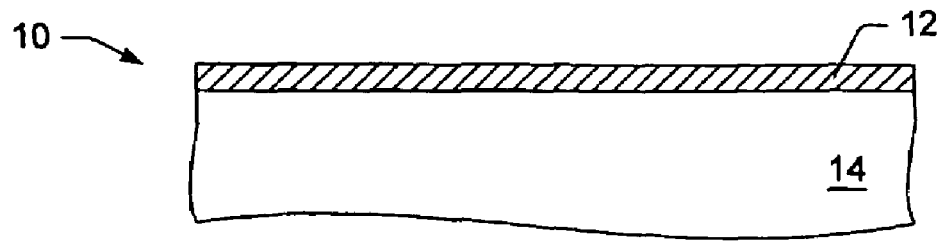
FIG. 1 depicts a partial cross-sectional view of a structure in which a first layer is formed upon a first substrate.

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

DESCRIPTION OF THE SPECIFIC EMBODIMENTS

Embodiments of the invention relate to calibration standards that may be used to calibrate lateral dimensional measurement systems and methods for making such calibration standards. The calibration standards include a lateral or angular dimension that may be produced and measured in a way traceable to NIST through the use of thin film deposition techniques and thin film metrology techniques. Lateral dimensional measurement systems may include, but may not be limited to, systems configured to perform a technique such as scatterometry and optical, electron beam, ion beam, atomic force, scanning electron, and scanning probe microscopy.

Commonly assigned U.S. Pat. No. 6,646,737, which is incorporated herein by reference, describes a calibration standard having a first substrate spaced from a second substrate and at least one layer having a traceably measured thickness disposed between the first and second substrates. The thickness of the layer may be traceably measured using any measurement technique in which a measurement system may be calibrated with a standard reference material traceable to a national testing authority. The calibration standard may be cross-sectioned in a direction substantially perpendicular to an upper surface of the first substrate. The cross-sectioned portion of the calibration standard may form a viewing surface of the calibration standard. In this manner, a lateral dimensional artifact of the calibration standard may include the traceably measured thickness of at least the one layer.

Although the calibration standard described in U.S. Pat. No. 6,646,737 provides a useful calibration standard for optical metrology equipment many improvements are still possible. Such improvements include, for example, structures with multiple traceably measured linewidth features, structures having markings that identify particular regions of a traceably measured feature, structures having trenches or other features with a traceably measured depth, and traceably measured linewidth and/or angular features that are substantially non-perpendicular to a viewing surface.

In embodiments of the present invention, calibration standards for submicron lateral dimensional metrology may be formed in a number of ways. For example, features of a calibration standard may be formed by a deposition and lamination processes. The calibration standard may generally include a first substrate spaced from a second substrate. In addition, the calibration standard may include at least one layer disposed between the first and second substrates. In some embodiments, the at least one layer may be a thin film or a layer of material of accurate and traceably measured thickness that may be used to define a lateral dimension of a feature. A traceably measured layer may be cross-sectioned in a direction substantially perpendicular or substantially non-perpendicular to an upper surface of the layer. A cross-sectional surface may be used as a viewing surface of the calibration standard. Thus, a traceably measured thickness of a layer may be substantially equal to a lateral dimension artifact of a calibration standard. The viewing surface may also be examined such that differences between layers of material may be observed. The calibration standard may also be etched to create topographic features such as lines and spaces. In this manner, topographic features of the calibration standard may have a traceably measured lateral dimension. Such topographic features may also be more representative of features formed during a semiconductor fabrication process and measured with a calibrated lateral dimensional measurement system than topographic features of currently available calibration standards.

Substantially pure layers may be formed on a first substrate. In addition, layers having a substantially planar upper surface may also be formed on a first substrate. In this manner, the layers may have a substantially uniform thickness over a surface area of the layers. The layers may have a thickness of approximately an atomic monolayer to approximately 2000 nm. For example, such layers may be formed using standard thin film deposition equipment that may be configured to use a technique such as oxidation, chemical vapor deposition ("CVD"), evaporation, sputtering, atomic layer deposition (ALD), and molecular beam epitaxy ("MBE"). Thickness metrology techniques having high accuracy and traceability to NIST may be used to measure a thickness of the layers. Such thickness metrology techniques may include, for example, optical ellipsometry, optical spectrophotometry, optical interferometry, profilometry, energy dispersive X-ray spectroscopy ("EDS"), thermal and acoustic wave techniques, cross-sectional TEM, and X-ray techniques. Cross sectioning and polishing processes may expose the structure of the deposited or laminated layers for examination. Furthermore, all of the techniques and processes described above may be currently available and inexpensive and may provide highly accurate lateral dimensional calibration standards having lateral dimensions below approximately 100 nm.

An additional advantage of such a calibration standard may include that a cross-sectioned surface of the calibration standard may be processed using a variety of techniques. For example, a layer of material of the calibration standard may be removed to a known depth below the cross-sectioned surface. As such, a calibration standard as described above may have a viewing surface that may be substantially planar or substantially non-planar. Thus, a feature such as a line of known width and height may be formed by removing material surrounding a layer of material of the calibration standard. Alternatively, spaces or trenches of known width and height may be formed by removing a layer of material below the cross-sectioned surface and leaving surrounding layers of material substantially intact. In addition, a combination of etch and deposition steps may be used to form a plurality of different features within a cross-sectioned surface of a calibration standard. Such a combination of features within a calibration standard may provide advantages for calibration of a lateral dimensional measurement system. For example, alternating layers of different materials may be used to form a repetitive pitch grating within a calibration standard. Alternatively, alternating layers of the same or different thicknesses and/or of the same or different materials may be used to form a calibration standard having multiple traceably measured linewidths.

Turning now to the drawings, FIGS. 1-4 illustrate a sequence of schematic cross-sectional views of an embodiment of a structure 10 in various stages of fabrication. As shown in FIG. 1, a first layer 12 is formed upon a first substrate 14. As used herein a "layer" may be distinguished from a "substrate" in that a substrate can typically exist as a free-standing structure without a layer but a layer typically requires a substrate for structural support. The first substrate 14 is preferably a semiconductor such as silicon. For example, the first substrate 14 may be a silicon substrate, which may be commonly referred to as a silicon "wafer." Appropriate substrates may also include silicon germanium, gallium arsenide, glass, and quartz. The first layer 12 may include polysilicon, metals, dielectrics, and any combination thereof. For example, the first layer 12 may include a dielectric layer such as a thermally grown silicon dioxide. A thermally grown silicon dioxide may be formed using any method known in the art. For example, a thermal oxidation furnace may be used to thermally grow a silicon dioxide.

The first layer 12 may also include a dielectric layer, e.g., silicon dioxide deposited by a suitable deposition technique. For example, silicon dioxide may be formed by chemical vapor deposition ("CVD") using a silicon source such as a silane source or a tetraethyloxysilane ("TEOS") source. Alternatively, the first layer 12 may include a silicon dioxide insulating layer formed below the surface of the first substrate 14 using a SIMOX process. The first layer 12 may also include silicon nitride ($Si_xN_y$), silicon oxynitride ($SiO_xN_y$($H_2$)), nitrided silicon dioxide, and silicon dioxide/silicon nitride/silicon dioxide (ONO). Alternatively, the first layer 12 may include a doped dielectric material such as borophosphosilicate glass ("BPSG"), phosphosilicate glass ("PSG"), and fluorinated silicate glass ("FSG"). Additionally, the first layer 12 may include a low-permittivity ("low-k") dielectric such as fluorine-doped silicon dioxide. In addition, the first layer 12 may include a high-permittivity ("high-k") dielectric such as tantalum pentoxide ($Ta_{0.2}O_{0.5}$), barium titanate ($BaTiO_3$), and titanium oxide ($TiO_2$). An appropriate material for the first layer 12, however, may also include any material which may be deposited with relatively good uniformity.

In addition, the first layer 12 may include a conductive material such as aluminum, polysilicon, silicon, copper, titanium, tungsten, titanium-tungsten alloys, titanium nitride, and chromium. Such materials may be formed using any method known in the art such as pyrolysis of triisobutyl aluminum ("TIBA"), sputtering, evaporation, chemical vapor deposition of silicon from a silane source, and physical vapor deposition ("PVD"). Furthermore, the first layer 12 may include any thin film material known in the art.

The first layer 12 may have a thickness of less than approximately 2000 nm. For example, the first layer 12 may have a thickness of approximately 10 nm to approximately 250 nm or less than approximately 100 nm. The thickness of the first layer 12 may be traceably measured using a measurement system such as a spectroscopic ellipsometer. A description of ellipsometry is presented by Harland G. Tompkins in "A user's guide to ellipsometry," Academic Press, Inc., San Diego, Calif. 1993, which is incorporated by reference as if fully set forth herein. Examples of spectroscopic ellipsometers are illustrated in U.S. Pat. Nos. 5,042,951 to Gold et al., 5,412,473 to Rosencwaig et al., 5,581,350 to Chen et al., 5,596,406 to Rosencwaig et al., 5,596,411 to Fanton et al., 5,771,094 to Carter et al., 5,798,837 to Aspnes et al., 5,877,859 to Aspnes et al., 5,889,593 to Bareket et al., 5,900,939 to Aspnes et al., 5,917,594 to Norton and 5,973,787 to Aspnes et al., and are incorporated by reference as if fully set forth herein. Additional examples of spectroscopic devices are illustrated in PCT Application No. WO 99/02970 to Rosencwaig et al., which is incorporated by reference as if fully set forth herein.

A measurement system used to measure a thickness of the first layer 12 may also include any system calibrated with a standard reference material traceable to NIST or another national testing authority. For example, appropriate measurement systems may be configured to measure a thickness of the first layer 12 using a technique such as ellipsometry, spectrophotometry, optical interferometry, profilometry, EDS, thermal and acoustic wave techniques, cross-sectional TEM, and X-ray techniques. The thickness of the first layer 12 may be traceably measured in this manner because the thickness of first layer 12 may be approximately equal to a lateral dimensional artifact of a calibration standard formed by subsequent steps. In this manner, all necessary steps should be taken to substantially eliminate measurement uncertainty.

Figure 2:
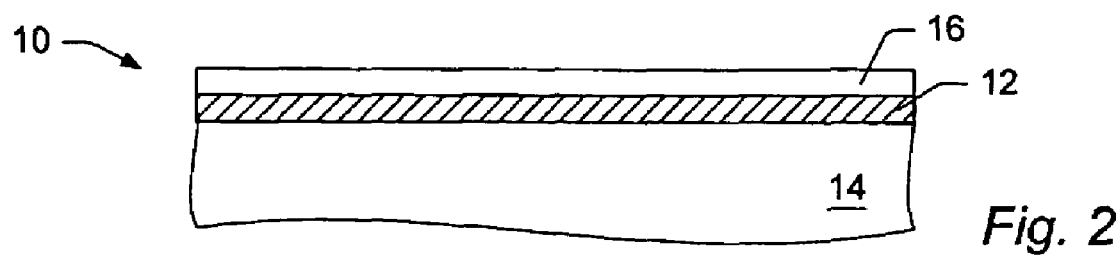
FIG. 2 depicts a partial cross-sectional view of a structure in which a second layer is formed upon the first layer subsequent to FIG. 1.

A second layer 16 may be formed upon the first layer 12 as shown in FIG. 2. Layer 16 may include any of the materials as described herein and may be deposited using any of the techniques as described herein. The second layer 16 may also include any material which may have a substantially different etch response than the first layer 12. For example, the second layer 16 may include a dielectric material that may have a substantially different etch response than a dielectric material of the first layer 12. The second layer 16 can have a thickness of less than approximately 2000 nm, or approximately 10 nm to approximately 250 nm. For example, an appropriate thickness of the second layer 16 may be less than approximately 100 nm. In addition, the second layer 16 may have a thickness that may be substantially equal to a thickness of the first layer 12. Many of the measurement techniques described above may be used to traceably measure a thickness of the second layer 16. For example, spectroscopic ellipsometry may be used to measure a thickness of a film, which may be formed upon buried layers such as the first layer 12, and in particular a buried layer having a previously determined thickness. In addition, a thickness of layer 16 may be measured using any of the techniques as described above.

Figure 3:
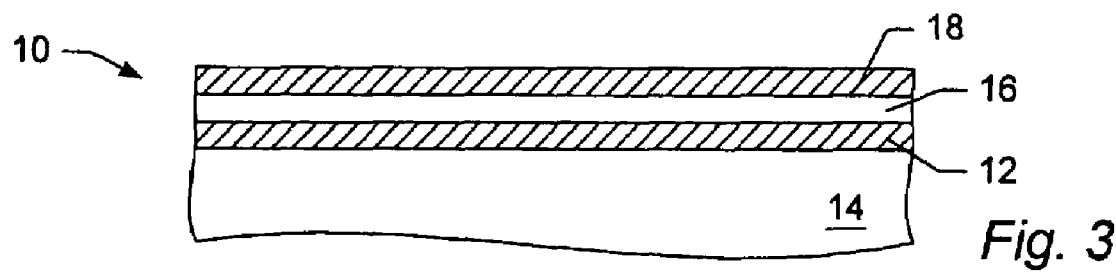
FIG. 3 depicts a partial cross-sectional view of a structure in which a third layer is formed upon the second layer subsequent to FIG. 2.

A third layer may be 18 formed upon the second layer 16 as shown in FIG. 3. The third layer 18 may be formed by any of the techniques as described herein. The third layer 18 may include any of the materials described above. Appropriate materials for the third layer 18 may include also any material which may have an etch response which may be substantially different than an etch response of the second layer 16. For example, the third layer 18 may include a conductive material that may have a substantially different etch response than a conductive material of the second layer 16. Appropriate materials for layer 18 may further include any material which may have an etch response that may be substantially equal to an etch response of the second layer 12. For example, the third layer 18 may include a dielectric material that may have an etch response which may be approximately equal to an etch response of a dielectric material of the second layer 12.

The third layer 18 may also have a thickness of less than approximately 2000 mm. For example, the third layer 18 can have a thickness of approximately 10 nm to approximately 250 nm, or less than approximately 100 nm. The thickness of the third layer 18 may be accurately measured using a measurement system such as a spectroscopic ellipsometer or any of the measurement systems described above. As described above, the measurement system may be calibrated with a standard reference material traceable to NIST or another national testing authority. The thickness of the third layer 18 may also be accurately measured because the thickness of this layer may be approximately equal to a width of a lateral dimensional artifact of a calibration standard. In this manner, all necessary steps should be taken to substantially eliminate measurement uncertainty. In addition, the first, second and third layers 12, 16, and 18 may have approximately equal thicknesses. Alternatively, the first second and third layers 12, 16 and 18 may have substantially different thicknesses.

Figure 4:
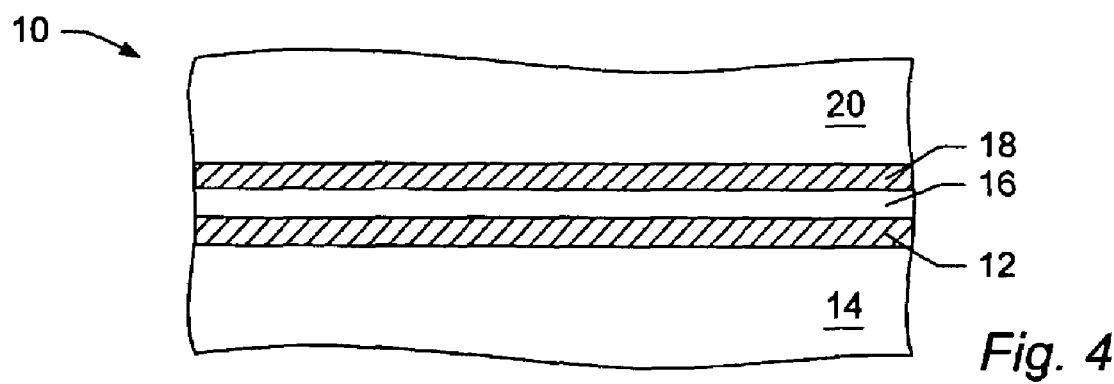
FIG. 4 depicts a partial cross-sectional view of a structure in which a second substrate is bonded to the third layer subsequent to FIG. 3.

A second substrate 20 bonded to the third layer 18 as shown in FIG. 4. For example, the second substrate 20 may be bonded to the third layer 18 by fusion bonding, anodic bonding, or diffusion bonding. The second substrate 20 may also be bonded to the third layer with an adhesive, such as an epoxy, a cyano acrylate, a polymer, or photoresist. The adhesive could be removed later in the process, for example after mounting the standard into another substrate, to form a thin air gap. The second substrate 20 may alternatively be applied to the third layer 18 by depositing a thick material by e.g. CVD to a thickness greater than about 2000 nm. In this manner, a chemical bond may be formed between the third layer 18 and the second substrate 20. The second substrate 20 may include a semiconductor such as silicon. For example, the second substrate 20 may be a silicon substrate, which may be commonly referred to as a silicon "wafer." Appropriate semiconductor substrates may also include silicon germanium, gallium arsenide, glass, and quartz. In this manner, the structure 10 may have a higher mechanical integrity due to the second substrate 20. In addition, the first layer 12, second layer 16, and third layer 18 may be supported between the first and the second substrates during subsequent processing.

Figure 5:
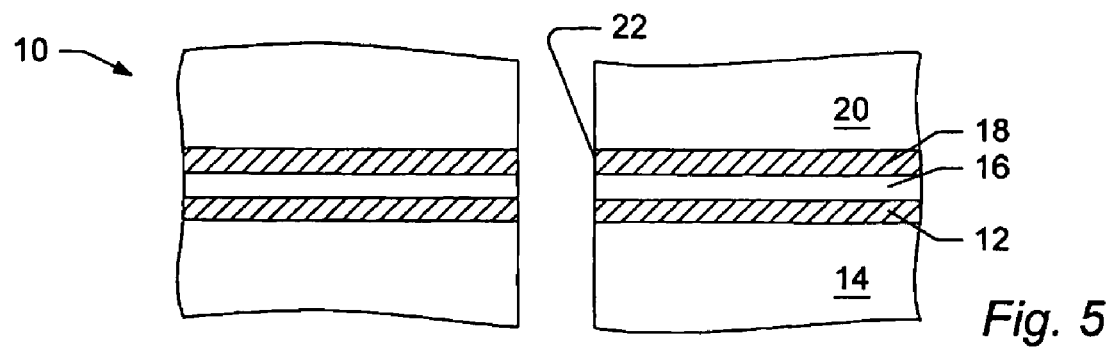
FIG. 5 depicts a partial cross-sectional view of a structure in which the structure is cross-sectioned in a direction substantially perpendicular to an upper surface of the first substrate subsequent to FIG. 4.

FIG. 5 illustrates the structure 10 cross-sectioned in a direction substantially orthogonal to at least an upper surface of the first substrate 14. For example, the structure 10 may be cross-sectioned or cut using a diamond saw to expose a cross-sectional surface 22. Alternative techniques for cutting the structure 10 may include cleaving, ion beam milling, and etching. Such cross-sectioning of the structure 10 may expose the structure of the deposited or laminated layers for additional processing or examination.

Subsequent processing of the structure 10 may include removing topographic roughness and residue remaining on the cross-sectional surface 22 from the cross-sectioning of the structure 10. Residue may be removed by a process such as an etch process, a milling process, a mechanical polishing process, or a chemical-mechanical polishing process. For example, an etch process may include a wet etch process in which the structure may be exposed to liquid etchants. Alternatively, an etch process may include a dry etch process in which the structure may be exposed to a plasma. The liquid etchants and the plasma may be selected to remove any residue remaining on the cross-sectional surface 22. In this manner, the cross-sectional surface 22 may be substantially planar. In addition, such subsequent processing of the structure 10 may expose the structure of the deposited or laminated layers for additional processing or examination.

Additional processing or examination may include measuring a thickness of the deposited or laminated layers using a traceable measurement technique. For example, appropriate traceable measurement techniques may include, but may not be limited to, cross-sectional TEM and atomic lattice counting, as described above. In addition, a thickness of the deposited or laminated layers may be measured using scanning electron microscopy. Furthermore, additional processing or examination may include removing a portion of the first substrate 14 and/or the second substrate 20 extending from the cross-sectional surface 22. In this manner, a thickness of the deposited or laminated layers may be measured using a traceable measurement technique such as, but not limited to, ellipsometry. Alternatively further processing or examination may include removing a portion of the first and third layers 12, 18, or a portion of the second layer 16. In this manner, a thickness of the deposited or laminated layers 12, 16, 18 may be measured using a traceable measurement technique such as, but not limited to, scanning probe microscopy.

Figure 6:
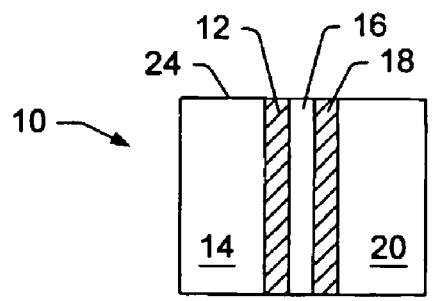
FIG. 6 depicts a partial cross-sectional view of a structure in which the structure is rotated such that the upper surface of the first substrate is substantially perpendicular to a viewing direction of a lateral dimensional metrology system subsequent to FIG. 5.

In addition, subsequent processing may also include mounting the structure in a manner suitable for incorporation into a measurement system to be calibrated. For example, the structure 10 may be rotated, as shown in FIG. 6, such that the cross-sectional surface 22, as shown in FIG. 5, may be a viewing surface 24 of a calibration standard. In this manner, the structure 10 may be substantially orthogonal to a viewing direction of the measurement system. In addition, the viewing surface 24 may be substantially planar as described above. Furthermore, mounting procedures may ensure that the viewing surface 24 may be mounted accurately with respect to the measurement system such that the viewing direction may be substantially orthogonal to the cross-sectional surface to avoid directional cosine error in visualizing the calibrated surface width. Alternatively, the structure 10 may be mounted such that the viewing direction may be at a known angle with respect to the cross-sectional surface such that a direction cosine correction factor may be utilized.

The structure 10, as shown in FIG. 6, may be used as a calibration standard for a measurement system. Lateral dimensional artifacts of the calibration standard may include at least one layer such as the first layer 12, the second layer 16, and the third layer 18. Calibration of a measurement system may include measuring a lateral dimensional artifact of the calibration standard and altering calibration factors of the measurement system such that the system may measure the lateral dimensional artifact correctly. For example, calibration factors of the measurement system may be altered if the measured lateral dimension is not substantially equal to the traceably measured thickness of the layer used to form the lateral dimensional artifact. In addition, by measuring lateral dimensional artifacts of the calibration having a variety of lateral dimensions, measurement system linearity may also be determined and/or altered.

Figure 7:
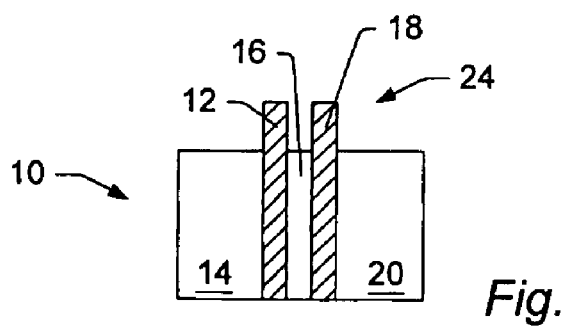
FIG. 7 depicts a partial cross-sectional view of a structure in which a portion of the first and second substrates and a portion of the second layer are removed subsequent to FIG. 6.
Figure 8:
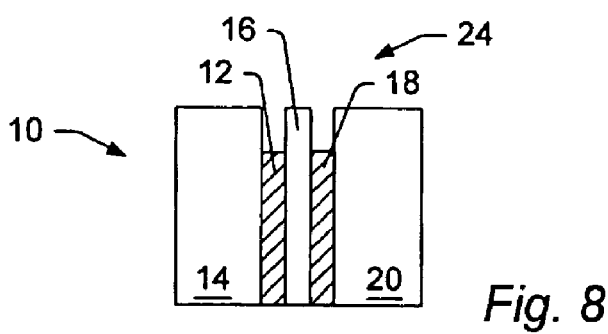
FIG. 8 depicts a partial cross-sectional view of a structure in which portions of the first and third layers are removed subsequent to FIG. 6.

Alternatively, an etch or milling process may be used to remove a portion of the structure 10 from the viewing surface 24. In this manner, the viewing surface 24 may be substantially non-planar as shown in FIGS. 7 and 8. In addition, a portion of at least one layer or semiconductor substrate may be removed to form topographic features of traceably measured lateral dimensions. For example, the first and third layers 12 and 18 may include silicon dioxide, (e.g., thermally grown silicon oxide) and the second layer 16 may include silicon (e.g., polysilicon or amorphous silicon). In addition, the first and second substrates 14 and 20 may include silicon. Therefore, the structure 10 may include two silicon dioxide layers. Each of the silicon dioxide layers may be disposed between silicon layers. As such, an etch process which may involve exposing the structure to a silicon etchant solution may be used to remove a portion of the silicon from the first and second substrates 14, 20 and second layer 16. For example, such an etch process may remove each silicon layer to approximately 1 µm below the viewing surface 24 while leaving silicon dioxide layers 12 and 18 substantially intact. As shown in FIG. 7, subsequent to such an etch process, silicon dioxide layers 12 and 18 extending above remaining portions of silicon layers 14, 16, and 20 may form silicon dioxide lines. The formed silicon dioxide lines may have a height of approximately one micron. The formed silicon dioxide lines may also have a traceably measured width of less than approximately 2000 nm. More preferably, the formed silicon dioxide lines may also have a traceably measured width of less than approximately 100 nm. In addition, due to the selectivity of such an etch process, the silicon dioxide lines may have substantially vertical sidewalls.

In FIG. 7, the etching process described above leaves the second layer 16 recessed behind the edges of the first and third layers 12 and 18 forming a trench-like feature between the first and third layers 16, 18. Alternatively, the second layer 16 may be recessed behind the edges of the first and third layers 12 and 18, e.g., by use of a process that etches the second layer 16 but not the first and third layers 12 and 18 and not the substrates 14 and 20. Such a process may form a trench in the cross-sectional surface 22 that may be used as a dimensional artifact.

Alternatively, an etch process which may involve exposing the structure to a Buffered Oxide Etch ("BOE") solution may be used to remove a portion of silicon dioxide layers 12 and 18. For example, such an etch process may remove each silicon dioxide layer to approximately 1 µm below the viewing surface 24 while leaving silicon layers 14, 16, and 20 substantially intact. As shown in FIG. 8, subsequent to such an etch process, silicon layers 14, 16, and 20 extending above remaining portions of silicon dioxide layers 12 and 18 may form a trench between silicon layers 14 and 16 and between silicon layers 16 and 20. The formed trenches may have a depth of approximately one micron. The formed trenches may also have a traceably measured width of less than approximately 2000 nm. More preferably, the formed trenches may also have a traceably measured width of less than approximately 100 nm. In addition, due to the selectivity of such an etch process, the formed trenches may have substantially vertical sidewalls.

Appropriate etch processes which may be used to remove a portion of the structure 10, however, may vary depending on the materials of the first substrate 14, the first, second and third layers 12, 16, 18, and the second substrate 20. Appropriate etch processes which may be used to remove a portion of the structure may also vary depending on a thickness of the removed portion of a semiconductor substrate or layer of the structure.

Figure 9:
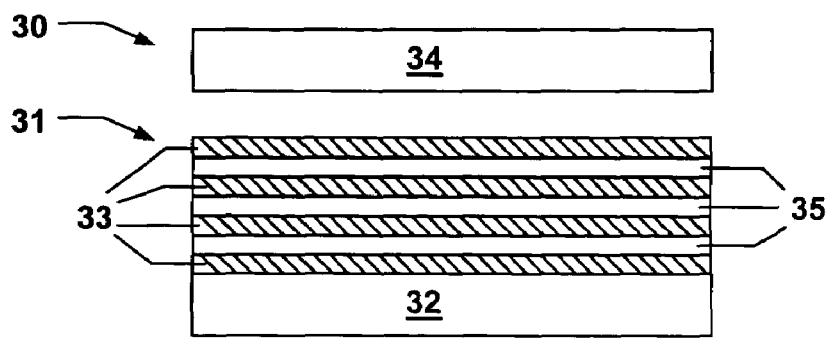
FIG. 9 depicts a partially assembled cross-sectional view of a structure in which a multilayer stack has been formed on a first wafer prior to bonding to a second wafer.
Figure 10:
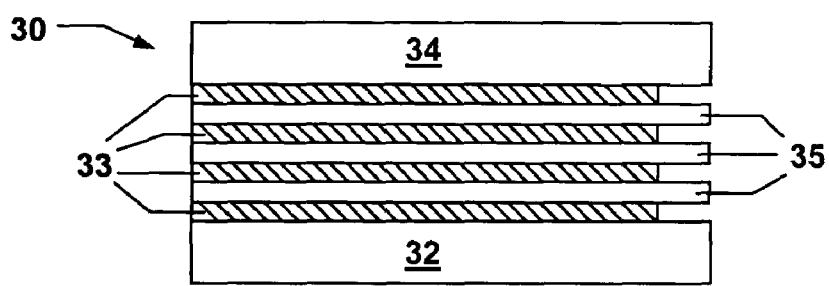
FIG. 10 depicts a partial cross-sectional view of the assembled structure of FIG. 10 after selected layers have been etched to produce multiple linewidths.

In an alternative embodiment, a variation on the structure 10 of FIG. 8 may be made with multiple features shown in FIGS. 9-10. Specifically, a structure 30 may include a multilayer stack 31 having two or more first layers 33 and two or more second layers 35 may be built up on a first substrate 32 as shown in FIG. 9. The first layers 33 and second layers 35 may alternate with respect to each other in the stack 31. The first layers 33 and/or second layers 35 can be of the same or different materials or of the same or different thicknesses. The first layers 33 and second layers 35 may be made of different materials including, but not limited to, any of the materials of the types described above, e.g., with respect to layers 12, 16 and 18. By way of example, and without loss of generality, the first layers 33 may be silicon dioxide layers and the second layers 35 may be polysilicon layers. Alternatively, the first layers 33 and second layers 35 could have the same or different thickness. In addition, the first layers 33 and second layers 35 could be made of different materials having the same thickness or different thicknesses. The thicknesses of the first layers 33 and second layers 35 may lie in any of the ranges described above, e.g. from about 1 atomic monolayer to about 2000 nm.

Preferably, a thickness of either the first layers 33, the second layers 35 or both may be traceably measured as described above, e.g., using any measurement technique in which a measurement system may be calibrated with a standard reference material traceable to a national testing authority, such as NIST or another national testing authority. By way of example, the traceably measured thickness may be determined using a traceable measurement technique such as thin film metrology, ellipsometry, spectrophotometry, interferometry, profilometry, or cross-sectional TEM. By way of example, and without loss of generality, the traceably measured thickness of the each of the first layers 33 or second layers 35 may be less than approximately 2000 nm. The first layers 33 and/or second layers 35 may be a material of a feature formed by a semiconductor fabrication process, which is to be measured with a lateral dimensional measurement system calibrated with the calibration standard.

A second substrate 34 may be bonded to the stack 31 as shown in FIG. 10. The structure 30 may be cross-sectioned, e.g., as described above with respect to FIG. 5 and cross-sectioned surface of structure 30 may be used as a viewing surface for a calibration standard having multiple linewidths. The viewing surface may be substantially planar or substantially non-planar. Furthermore, the viewing surface may be subject to removal of residue, polishing, and other processing following cross-sectioning, e.g., as described above with respect to FIG. 5. The first layers 33 may be etched back so that the second layers 35 extend above remaining portions of the first layers 33. Alternatively, portions of the first substrate 32 and/or second substrate 34 may be etched back so that the first and second layers extend beyond the viewing surface. One or more of the first layers 33 and/or second layers 35 may form a topographic feature of the calibration standard 30. Such a topographic feature may be a line.

Figure 11:
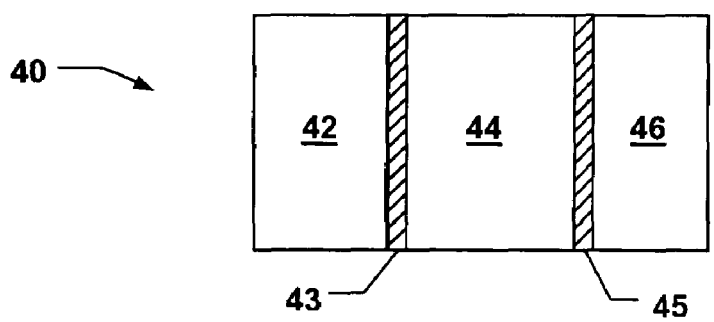
FIG. 11 depicts a partial cross-sectional view of a structure in which a first layer is disposed between first and second substrates and a second layer is disposed between second and third substrates.

Multiple linewidth structures may also be fabricated using a structure having three or more substrates in an alternating arrangement with two or more layers. For example, FIG. 11 depicts a partial cross-sectional view of a calibration standard in which a structure 40 has a first layer 43 disposed between a first substrate 42 and a second substrate 44 and a second layer 45 is disposed between the second substrate 44 and a third substrate 46. A viewing surface of the calibration standard comprises a cross-sectional surface of the calibration standard, and wherein the cross-sectional surface is substantially perpendicular or substantially non-perpendicular to an upper surface of either first, second or third substrates 42, 44, 46. The viewing surface may be substantially planar or substantially non-planar. At least one of the first layer 43 or the second layer 45 or both comprises a traceably measured thickness such that a lateral dimensional artifact of the calibration standard comprises the traceably measured thickness of the layer(s). The first, second and third substrates 42, 44, 46 may be made of any of the materials and have any of the features or physical dimensions described above with respect to the substrates 14 and 20. The first and second layers 43, 45 may be made of any of the materials and have any of the features or physical dimensions described above, e.g., with respect to layers 12, 16 and 18. Although FIG. 11 depicts a structure having three substrates and two layers, this embodiment may be extended to structures in which three or more layers alternate with four or more substrates in a manner analogous to that shown in FIG. 11, e.g., with the layers and substrates alternating with each other in a stack.

The structure 40 may be fabricated, e.g., as follows. The first layer 43 may be formed upon an upper surface of the first substrate 42. A thickness of the first layer 43 may be determined using a traceable measurement technique. The second substrate 44 may be bonded to an upper surface of first layer 43, e.g., by fusion bonding, anodic bonding, or diffusion bonding or adhesive, e.g., as described above. The second layer 45 may be formed upon an upper surface of the second substrate 44 or the third substrate 46. The thickness of the second layer 45 may be determined using a traceable measurement technique. The third substrate 46 may be bonded to an upper surface of the second layer 45 e.g., by fusion bonding, anodic bonding, or diffusion bonding or adhesive, e.g., as described above. The structure 40 including the first substrate 42 the first layer 43, the second substrate 44, the second layer 45, and the third substrate 46 may be cross-sectioned in a plane substantially perpendicular or substantially non-perpendicular to at least the upper surface of the first substrate 42 to form a viewing surface of the calibration standard such that a lateral dimensional artifact of the calibration standard comprises the determined thickness of the at least one first layer and/or the at least one second layer. Layers 43 and 45 may in turn be composed of multilayer stacks, e.g., as shown in FIG. 6 and FIGS. 9-10. Furthermore, the structure shown in FIG. 11 may be extended to include more than 3 substrates.

Figure 12:
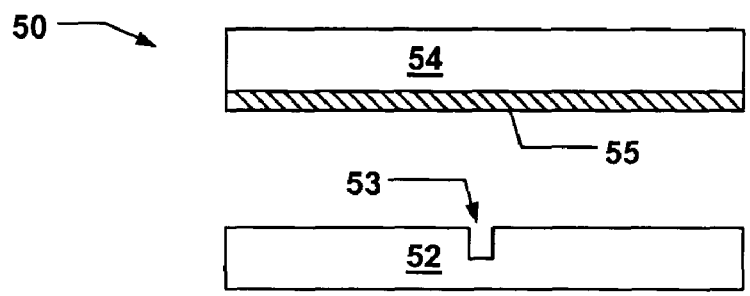
FIG. 12 depicts a partially assembled cross-sectional view of a structure in which a feature has been etched in a first substrate and a layer has been deposited on a second substrate.
Figure 13:
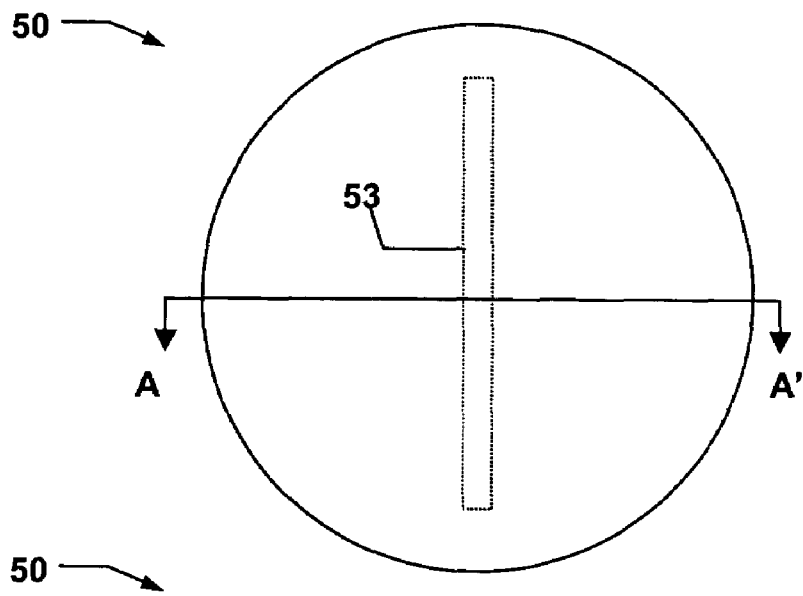
FIG. 13 depicts a planar view of the assembled structure of FIG. 12.
Figure 14:
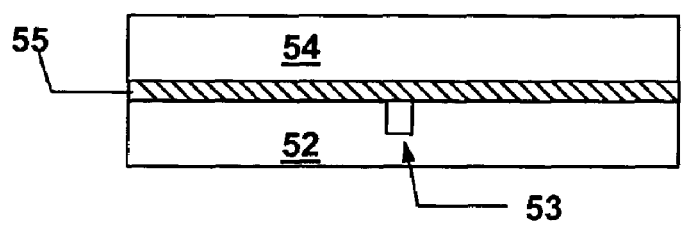
FIG. 14 depicts a partial cross-sectional view of the structure of FIG. 13 taken along line A-A'.

It is sometimes desirable to mark specific areas along a linewidth feature in a calibration standard. According to another alternative embodiment of the invention, such marking may be accomplished by patterning and etching or otherwise forming structures on the surface of one or more of the wafers before bonding and cross-sectioning. For example, FIGS. 12-14 depicts a calibration standard having a structure 50 in which at least one etched feature 53 has been formed in a first substrate 52 and a layer 55 has been deposited on a second substrate 54. The first substrate 52 is bonded to the layer 55 such that the layer 55 is disposed between the first and second substrates 52, 54. The structure may be cross-sectioned, e.g., along line A-A' of FIG. 13, such that the feature 53 intersects the cross-sectioned surface, which serves as a viewing surface for the calibration standard. The layer 55 may have a traceably measured thickness, as described above. A viewing surface of the calibration standard comprises a cross-sectional surface of the calibration standard such that a lateral dimensional artifact of the calibration standard comprises the traceably measured thickness of the layer 55. The feature 53 may point to or otherwise mark a particular calibrated area of the layer 55. Although FIGS. 12-14 depict a structure 50 having a single layer between first and second substrates 52, 54 those of skill in the art will recognize that two or more layers may be disposed between the first and second substrates 52, 54. For example, three layer structures such as those described above with respect to FIGS. 1-8 may be disposed between the first and second substrates 52, 54. Alternatively, multi-layer stacks may be disposed between the first and second substrates 52, 54, e.g., as described above with respect to FIGS. 9-10.

A calibration standard of the type depicted in FIGS. 12-14 may be fabricated as follows. A feature may be formed on an upper surface of the first substrate 52. At least one layer, e.g., layer 55, may be formed upon the upper surface of the second substrate 54. A thickness of the layer 55 may be determined using a traceable measurement technique, e.g., as described above. The first substrate 52 may be bonded to an upper surface of the layer 55 as shown in FIG. 14, as described above, e.g., by fusion bonding, anodic bonding, or diffusion bonding or adhesive, e.g., as described above. The structure 50 including the first substrate 52, the layer 55, and the second substrate 54 may be cross-sectioned, as described above, e.g., in a plane substantially perpendicular or substantially non-perpendicular to at least the upper surface of the first substrate 52, to form a viewing surface of the calibration standard such that a lateral dimensional artifact of the calibration standard comprises the determined thickness of the layer 55 wherein the feature 53 intersects the viewing surface.

By way of example, and without loss of generality, the feature 53 may be in the form of a trench, which may be etched into an upper surface of the first substrate 52, e.g., by placing an etch mask on the upper surface of the first substrate 52 and etching through the mask, e.g., with a wet or dry etch process. Alternatively, the feature 53 may be formed by a maskless process, such as laser milling, focused on beam milling, or electron beam lithography.

In a variation on the embodiment of FIGS. 12-14, a feature formed in the upper surface of a substrate may be used as a dimensional standard. Specifically, a calibration standard may include a first substrate and a second substrate arranged with their upper surfaces facing each other. One of the two substrates has at least one etched feature formed in its upper surface. A viewing surface of the calibration standard comprises a cross-sectional surface of the calibration standard, and wherein the cross-sectional surface is substantially perpendicular or substantially non-perpendicular to an upper surface of at least the first substrate such that a lateral dimensional artifact of the calibration standard comprises the traceably measured depth of the at least one etched feature.

Such a calibration standard may be fabricated, e.g., as follows. At least one etched feature may be formed in an upper surface of a first substrate. A depth of the etched feature may be determined using a traceable measurement technique. A second substrate may be bonded to the upper surface of the first substrate. The first substrate, the at least one feature, and the second substrate may be cross-sectioned in a plane substantially perpendicular or substantially non-perpendicular to at least the upper surface of the first substrate to form a viewing surface of the calibration standard such that a lateral dimensional artifact of the calibration standard comprises the determined depth of the at least one layer as described above.

Figure 15:
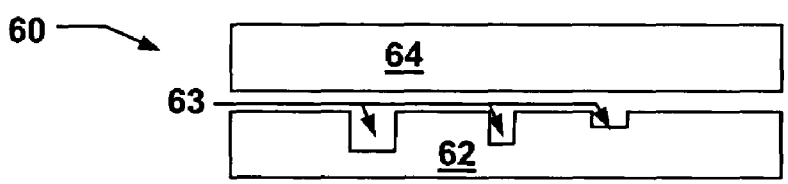
FIG. 15 depicts a partially assembled cross-sectional view of a structure having two substrates in which features have been etched in a first substrate.
Figure 16:
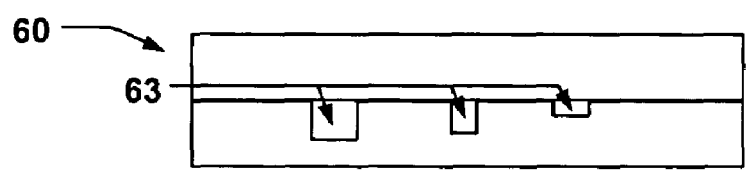
FIG. 16 is a cross-sectional view of the assembled structure of FIG. 15 with the two substrates bonded together.

By way of example, FIG. 15 depicts a partially assembled cross-sectional view of a calibration standard 60 having a first substrate 62 and a second substrate 64. One or more features 63 have been formed into an upper surface of the first substrate 62 as described above with respect to the etched feature 53. FIG. 16 is a cross-sectional view of the assembled structure of FIG. 15 with the two substrates bonded together. The substrates may be made of any of the materials described above with respect to substrates 14 and 20 above. In the example depicted in FIGS. 15-16, features of various depths have been created in a precisely controlled manner, e.g., by etching or by consumption of substrate material through differential oxidation, to obtain multiple linewidths after cross-sectioning and polishing.

Figure 17:
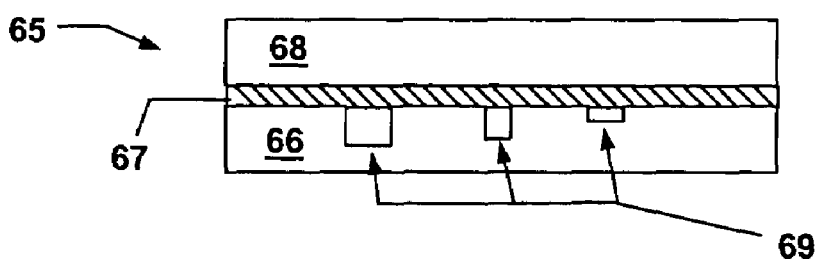
FIG. 17 is a cross-sectional view of an alternative structure in which the first wafer has etched features and a layer is disposed between the first and second wafers.

Variations on the structure of FIGS. 15-16 are within the scope of the invention. For example, FIG. 17 shows a similar structure 65 but with a layer of material 67 (e.g., oxide or other material described above with respect to layers 12, 16 and 18) between a first substrate 66 and a second substrate 68. Features 69 are etched into the upper surface of the first substrate 66 as described above.

Figure 18:
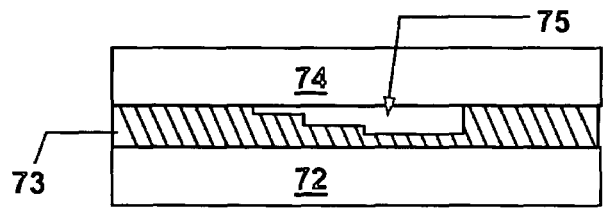
FIG. 18 is a cross-sectional view of another alternative embodiment in which features are etched in a layer disposed on an upper surface of the first wafer.

Alternatively features 75 may be etched in a layer 73 disposed on an upper surface of a first substrate 72 as shown in FIG. 18. A second substrate 74 is bonded to an upper surface of the layer 73. As shown in the example depicted in FIG. 18, the features 75 may be in the form of a series of steps of different heights. Alternatively, the features 75 may be other shaped features such as trenches. A filler material (not shown) may optionally fill one or more spaces in the features 75 to keep the second substrate 74 from conforming to the features 75 when the second substrate is bonded to the upper surface of the layer 73. By way of example, the filler material may be spin-on materials, such as spin-on-glass or a polymer.

Figure 19:
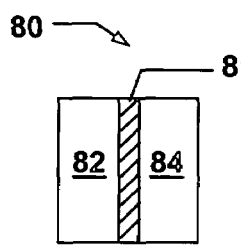
FIG. 19 is a partial cross-sectional view of a structure in which a layer is disposed between first and second substrates.
Figure 20:
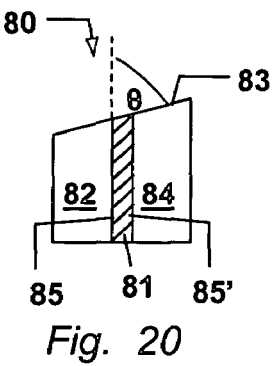
FIG. 20 is a partial cross-sectional view of the structure of FIG. 19 in which a cross-sectional surface of the structure has been polished at a non-perpendicular angle with respect to an upper surface of one of the substrates.

In yet another alternative embodiment, the process described above with respect to FIGS. 1-8 may be modified in order to provide a sidewall angle calibration standard. Such a calibration standard generally includes a structure having a first substrate spaced from a second substrate and at least one layer disposed between the first and second substrates. The at least one layer may optionally comprise a traceably measured thickness as described above. A viewing surface of the calibration standard comprises a cross-sectional surface of the calibration standard. The cross-sectional surface is at a traceably measured angle that is substantially non-perpendicular to a surface of the first or second substrate that is proximate to the at least one layer such that an angular dimensional artifact of the calibration standard comprises the traceably measured angle. The traceably measured angle may be determined with a traceable measurement technique, e.g., using a measurement system calibrated with a standard reference material traceable to a national testing authority. The at least one layer may comprise a material of a feature formed by a semiconductor fabrication process, and an angular dimension of the feature may be measured with an angular dimensional measurement system calibrated with the calibration standard. Such a calibration standard may be used, e.g., as a standard for CD-SEM capable of measuring sidewall angles in lithographic metrology. Alternatively, such a calibration standard may be used as a standard for atomic force microscopy (AFM) capable of measuring sidewall angles in etch processes such as STI. By way of example, the fabrication of such a sidewall angle calibration standard may proceed as follows. A structure 80 can be fabricated with a layer of material 81 disposed between a first substrate 82 and a second substrate 84 as shown in FIG. 19. The first and second substrates 82, 84 may be made of any of the materials described above with respect to substrates 14 and 20. The layer of material may be made of any of the materials and deposited by any of the techniques described above with respect to layers 12, 16, and 18. The structure 80 may be cross-sectioned to provide a viewing surface 83 as described above. The viewing surface 83 is polished at a substantially non-perpendicular angle θ with respect to a surface 85 of the first substrate 82 that is proximate to the layer 81 as shown in FIG. 20. Generally speaking, the angle θ is less than or an equivalent angle greater than 90° depending on whether the angle θ is measured with respect to the surface 85 of the first substrate or a surface 85' of the second substrate 84 that is proximate to the layer 81. By way of example, the angle θ may range from about 45° up to but not including 90° or, equivalently, from about 135° down to but not including 90°. More preferably, the angle θ may range from about 80° up to but not including 90° or, equivalently, from about 100° down to but not including 90°. Alternatively, the viewing surface may be polished at a non-perpendicular angle with respect to a surface 85' of the second substrate 84 that is adjacent to the layer 81.

Figure 21:
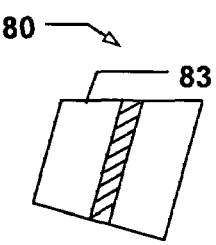
FIG. 21 is a partial cross-sectional view of the structure of FIG. 20 mounted with the front surface horizontal.
Figure 22:
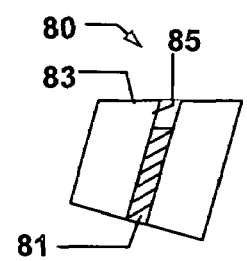
FIG. 22 is a partial cross-sectional view of the structure of FIG. 20 with the layer etched back.

The structure 80 may be polished, in a polishing jig, e.g., using standard mechanical, or chemical mechanical polishing techniques. The angle θ may be controlled mechanically on a microscopic scale by the way the polishing jig is machined or adjusted. The angle θ may be measured using a traceable angle measurement technique. By way of example, the angle θ may be measured mechanically or optically and may be certified, e.g., by focused ion beam (FIB) cross-section or high-resolution transmission electron microscope (HRTEM) cross-section. By way of example, the angle θ may be measured optically by observation of a side cross-section (i.e., a cross-section in the plane of the drawing in FIG. 20) of the polished piece in an optical microscope or by measuring the directions of the reflections of a laser beam against the viewing surface 83 and against one of the upper surfaces 85, 85' of one of the substrates 82, 84. The structure 80 may be mounted with the viewing surface 83 substantially horizontal with respect to some reference plane as shown in FIG. 21. A portion of the layer 81 may be removed, e.g., by a suitable etching technique, so that an edge of the layer 81 lies below the level of the viewing surface 83 to create an angled trench as shown in FIG. 22. Alternatively, portions of the first and second substrates 82, 84 may be removed so that a portion of the layer 81 projects beyond the level of the viewing surface 83 to create an angled protrusion as opposed to an angled trench.

Figure 23:
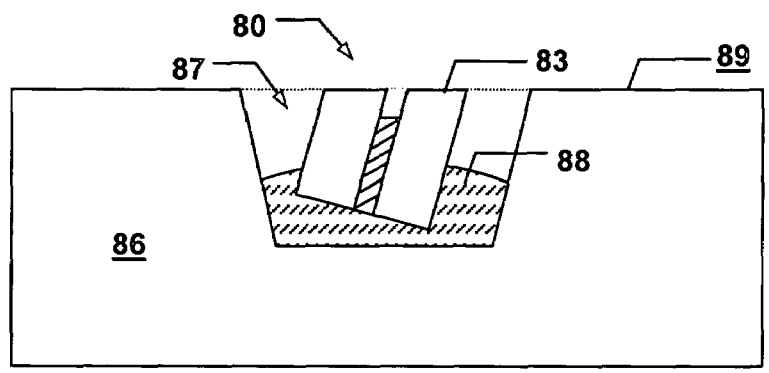
FIG. 23 is a partial cross-sectional view of the structure of FIG. 22 mounted in an opening in a wafer with the front surface of the structure substantially co-planar with an upper surface of the wafer.
Figure 24:
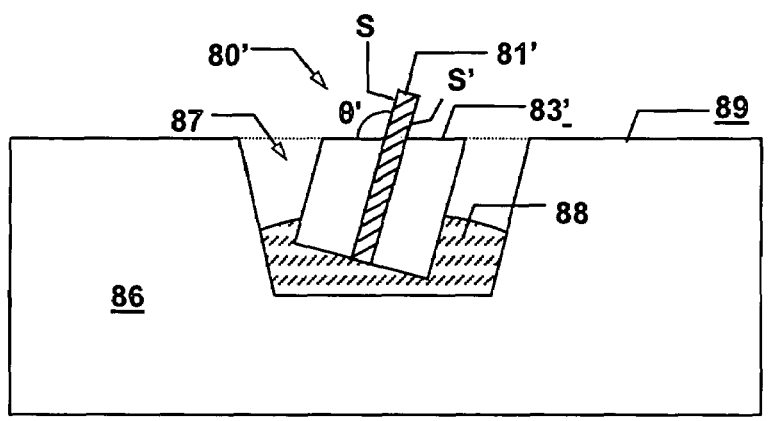
FIG. 24 is a partial cross-sectional view of an alternative structure mounted in an opening in a wafer where a portion of the layer protrudes beyond the viewing surface of the structure.

If the structure 80 is particularly small, e.g., 1-2 mm on a side, a larger die 86 (e.g. 10-20 mm on a side) may be used to mount the structure 80 with the viewing surface substantially horizontal with respect to a reference surface 89 of the die 86 as shown in FIG. 23. The die 86 may include an opening 87 sized to receive the structure 80. An adhesive 88, such as an epoxy or carbon paste, conductive gold adhesive, silver paste, or cyanoacrylate, may secure the structure 80 to the die 86. This technique may also be used to align a structure 80' having a layer 81' that projects beyond a viewing surface 83' at a traceably measured angle θ' with respect to the viewing surface 83' as shown in FIG. 24. In the example depicted in FIG. 24, the traceably measured angle θ' may be traceably measured with respect to a surface S of the layer 81', e.g., using the techniques described above. Alternatively, the traceably measured angle θ' may be measured with respect to an opposite surface S' of the layer 81'. The traceably measured angle θ' may lie within the ranges described above with respect to the angle θ.

Figure 25:
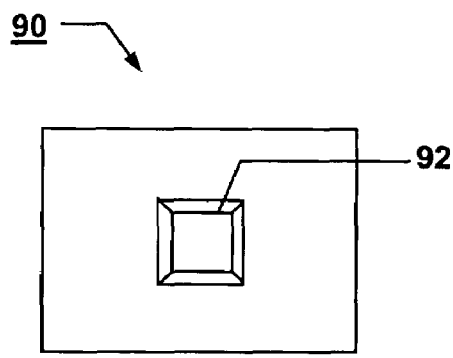
FIG. 25 is a top view of a die for mounting a structure.
Figure 26:
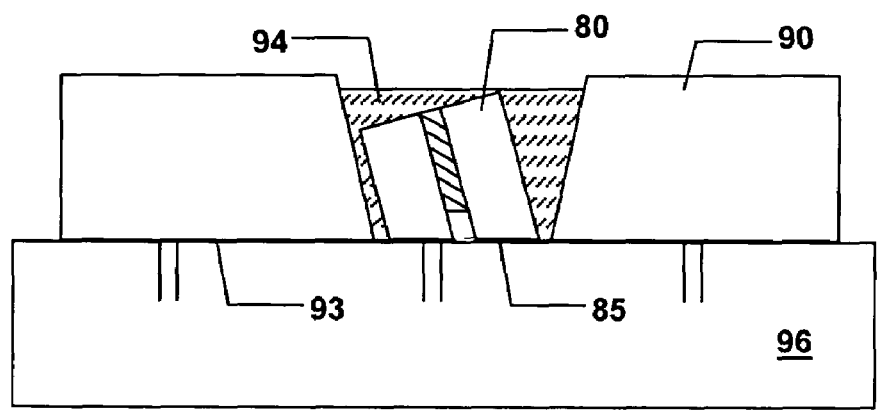
FIG. 26 is a partial cross-sectional view of a die and structure being aligned with respect to each other.

The viewing surface 83 of the structure 80 may be aligned with respect to the surface of a die using a chuck and a die. For example, a die 90 may have an opening 92 as shown in FIG. 25. The die 90 may comprise a rectangular substrate made of silicon, glass, quartz or other suitable material. The opening 92 may extend all the way through the die 90 as shown in FIG. 26. The die 90 may have tapered sidewalls as shown in FIG. 26. Such tapered sidewalls may be formed, e.g., by using a suitable anisotropic wet etchant capable of forming the opening 92 in the die 90. For example, when the die is made of silicon, the wet etchant may comprise a hydroxyl-containing etchant such as, e.g., tetramethyl ammonium hydroxide (TMAH), potassium hydroxide (KOH), or ethylene diamine pyrocathechol ($C_6H_4(OH)_2$ also know as EDP). Alternatively, a straight-walled opening may be formed in the die 90, e.g., using a laser to cut the opening in the die 90.

The structure 80 may be mounted in the opening 92 by any suitable means. For example, the die may be secured in the opening by an adhesive 94, which may comprise any adhesive or glue capable of bonding to both the die 90 and the structure 80. By way of example, the adhesive 94 may be an epoxy, carbon paste, conductive gold adhesive, silver paste, or cyano acrylate. The adhesive 94 may be applied to a rear side of the structure 80 (i.e., the side opposite the viewing surface 83) and to the sidewalls of the opening 92 in the die 90. The adhesive 94 is then allowed to dry after which it may be baked to remove any solvents. Times for air drying and baking may be determined empirically based on the particular materials used.

The die 90 and structure 80 may be placed against a chucking surface of a chuck 96. The chuck 96 creates a force that attracts the die 90 and structure 80 pressing an upper surface 93 of the die 90 and the viewing surface 83 against a chucking surface of the chuck 96 such that the viewing surface 83 and the upper surface 93 of the die 90 are substantially co-planar with the surface of the chuck 96 and substantially co-planar with respect to each other. By way of example, and without loss of generality, the chuck 96 may be a vacuum chuck or an electrostatic chuck. The structure 80 may be secured in opening 92 in the die 90. e.g., with an adhesive 94. The chuck 96 may hold the die 90 and the structure 80 against the chucking surface of the chuck 96 while the adhesive 94 cures to preserve the alignment of the viewing surface 83 with respect to the surface of the chuck 96.

Figure 27:
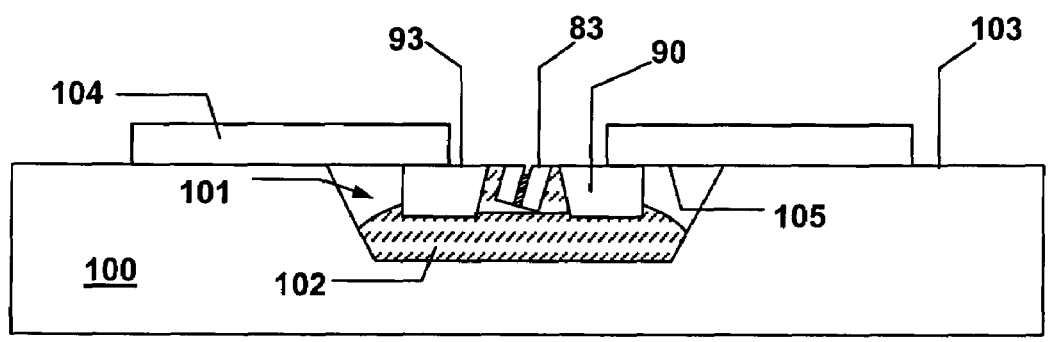
FIG. 27 is a partial cross sectional view of a die and structure being aligned with respect to an upper surface of a wafer.

The die 90 and structure 80 may be aligned with respect to a larger substrate or other object. For example, as shown in FIG. 27, a carrier substrate 100 may include an opening 101 sized to receive the die 90, which is placed in the opening 101 with the upper surface 93 of the die 90 and viewing surface 83 of the structure 80 substantially aligned with an upper surface 103 of the carrier substrate 100. It may be desirable to make the die 90 and carrier substrate 100 from the same material to reduce problems with differential thermal expansion. An adhesive 102 may be placed in the opening 101 to secure the die 90 to the carrier substrate 100. An optical flat 104 may be placed on the upper surface 103 of the carrier substrate 100 and pressed against the die 90 to align the viewing surface 83 of the structure 80 and the upper surface 93 of the die 90 with respect to the upper surface 103 of the carrier substrate 100. After the adhesive 102 has cured, the optical flat 104 may be removed. Note that the optical flat 104 may include an opening so that the surface of the optical flat 104 does not touch the viewing surface 83.

In the various embodiments described above, a lateral dimension of a feature such as a line or a space subsequent to an etch process may be different than a lateral dimension of the feature prior to the etch process. Therefore, variation in a lateral dimension of a feature may be measured and corrected for in a nominal value of the lateral dimension subsequent to an etch process. In addition, systematic atmospheric growth phenomena such as the growth of native oxide on an exposed silicon surface may alter a lateral dimension of features over time. As such, variation in a lateral dimension of a feature may be measured and corrected for in a nominal value for the lateral dimension over time.

Applications for calibration standards such as those described herein may be numerous. For example, materials that may be included in the structure of the calibration standard may vary depending upon a semiconductor fabrication process which the calibration standard may be designed to simulate. In an example, silicon dioxide layers surrounding a chromium layer may be used to simulate features which may be formed on a surface of a photomask. A photomask may be a mask which may be disposed above a resist and may have substantially transparent regions and substantially opaque regions which may be configured in a pattern which may be transferred to the resist. In addition, successive layers of silicon and silicon dioxide may be used to simulate a pitch grating of traceably measured lateral dimensions. Furthermore, additional processing of a cross-sectional surface or a viewing surface may include deposition of additional surface coatings. Additional surface coatings may protect or modify the cross-sectional surface to increase the utility and/or durability of the calibration standard.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. The appended claims are not to be interpreted as including means-plus-function or step-plus-function limitations, unless such a limitation is explicitly recited in a given claim using the phrase "means for" or "step for".

What is claimed is:

1. A calibration standard, comprising:
   three or more substrates in an alternating arrangement with two or more layers including a first substrate spaced from a second substrate;
   at least one first layer disposed between the first and second substrates,
   a third substrate spaced from the second substrate; and
   at least one second layer disposed between the second and third substrates;
   wherein at least one of the first and second layers comprises a traceably measured thickness,
   wherein a viewing surface of the calibration standard comprises a cross-sectional surface of the calibration standard, and wherein the cross-sectional surface is substantially perpendicular or substantially non-perpendicular to an upper surface of one or more of the substrates such that a lateral dimensional artifact of the calibration standard comprises the traceably measured thickness of one or more of the layers.

2. The standard of claim 1, wherein the traceably measured thickness is between about one atomic layer and about 2000 nm.

3. The standard of claim 1, wherein the traceably measured thickness is determined using a traceable measurement technique.

4. The standard of claim 3 wherein the traceable measurement technique comprises thin film metrology, ellipsometry, spectrophotometry, interferometry, profilometry, or cross-sectional TEM.

5. The standard of claim 1, wherein the traceably measured thickness is determined with a measurement system calibrated with a standard reference material traceable to a national testing authority.

6. The standard of claim 1, wherein the viewing surface is substantially planar.

7. The standard of claim 1, wherein the viewing surface is substantially non-planar.

8. The standard of claim 1, wherein a portion of one or more of the layers or substrates extending from the cross-sectional surface is removed to form a trench or line in the calibration standard.

9. The standard of claim 1, wherein one or more of the layers comprises a material of a feature formed by a semiconductor fabrication process, and wherein a lateral dimension of the feature is to be measured with a lateral dimensional measurement system calibrated with the calibration standard.

10. The standard of claim 1, wherein the traceably measured thickness is approximately equal to a lateral dimension of a feature formed by a semiconductor fabrication process, and wherein the lateral dimension of the feature is to be measured with a lateral dimensional measurement system calibrated with the calibration standard.

11. The standard of claim 1, further comprising at least three layers disposed between the first and second substrates, wherein the at least three layers comprise at least one feature of the calibration standard.

12. The standard of claim 1, further comprising at least three layers disposed between the first and second substrates, wherein the at least three layers comprise at least a first feature and a second feature, and wherein a traceably measured thickness of the first feature is approximately equal to a traceably measured thickness of the second feature.

13. The standard of claim 1, further comprising at least three layers disposed between the first and second substrates, wherein the at least three layers comprise at least a first feature and a second feature, and wherein a traceably measured thickness of the first feature is substantially different than a traceably measured thickness of the second feature.

14. The standard of claim 1, wherein the first substrate or the second substrate comprises a semiconductor, quartz or glass.

15. A method for forming a calibration standard, comprising the steps of:
forming at least one first layer upon an upper surface of a first substrate; determining a thickness of the at least one first layer using a traceable measurement technique;
bonding a second substrate to an upper surface of the at least one first layer;
forming at least one second layer upon an upper surface of the second substrate or a third substrate;
determining a thickness of the at least one second layer using a traceable measurement technique;
bonding the third substrate to an upper surface of the at least one second layer; and
cross-sectioning the first substrate, the at least one first layer, the second substrate, the at least one second layer, and the third substrate in a plane substantially perpendicular or substantially non-perpendicular to at least the upper surface of the first substrate to form a viewing surface of the calibration standard such that a lateral dimensional artifact of the calibration standard comprises the determined thickness of the at least one first layer and/or the at least one second layer.

16. The method of claim 15, wherein the determined thickness of the at least one first layer and/or the at least one second layer is between about one atomic layer and about 2000 nm.

17. The method of claim 15, wherein the traceable measurement technique comprises thin film metrology, ellipsometry, spectrophotometry, interferometry, profilometry, or cross-sectional TEM.

18. The method of claim 15, wherein determining the thickness of the at least one first layer and/or the at least one second layer comprises calibrating a measurement system with a standard reference material traceable to a national testing authority.

19. The method of claim 15, further comprising planarizing the cross-sectioned first substrate, the at least one first layer, the second substrate, the at least one second layer and the third substrate such that the viewing surface is substantially planar.

20. The method of claim 15, further comprising removing a portion of the first substrate, the at least one layer, and the second substrate extending from the viewing surface such that the viewing surface is substantially non-planar.

21. The method of claim 15, further comprising removing a portion of the first, second and/or third substrates extending from the viewing surface such that the at least one first layer and/or the at least one second layer forms a topographic feature of the calibration standard.

22. The method of claim 21 wherein the topographic feature comprises a line.

23. The method of claim 15, further comprising removing a portion of the at least one first layer and/or the at least one second layer extending from the viewing surface to form a trench in the calibration standard.

24. A calibration standard, comprising: a first substrate spaced from a second substrate; and at least one first layer, at least one second layer and at least one third layer disposed between the first and second substrates, with the second layer disposed between the first and third layers, wherein a portion of the at least one second layer extends beyond or is recessed behind an edge of the at least one first layer and wherein a portion of the at least one second layer extends beyond or is recessed behind an edge of the at least one third layer, wherein the second layer comprises a traceably measured thickness, wherein a viewing surface of the calibration standard comprises a cross-sectional surface of the calibration standard, and wherein the cross-sectional surface is substantially perpendicular or substantially non-perpendicular to an upper surface of at least the first substrate such that a lateral dimensional artifact of the calibration standard comprises the traceably measured thickness of the at least one second layer.

25. The standard of claim 24, wherein the traceably measured thickness is between about one atomic layer and about 2000 nm.

26. The standard of claim 24, wherein the traceably measured thickness is determined using a traceable measurement technique.

27. The standard of claim 26 wherein the traceable measurement technique comprises thin film metrology, ellipsometry, spectrophotometry, interferometry, profilometry, or cross-sectional TEM.

28. The standard of claim 24, wherein the traceably measured thickness is determined with a measurement system calibrated with a standard reference material traceable to a national testing authority.

29. The standard of claim 24, wherein the viewing surface is substantially planar.

30. The standard of claim 24, wherein the viewing surface is substantially non-planar.

31. The standard of claim 24, wherein the traceably measured thickness is approximately equal to a lateral dimension of a feature formed by a semiconductor fabrication process, and wherein the lateral dimension of the feature is to be measured with a lateral dimensional measurement system calibrated with the calibration standard.

32. The standard of claim 24, further comprising at least a fourth and a fifth layer,
  wherein the fourth layer is disposed between the third layer and the fifth layer and wherein the fifth layer is disposed between the fourth layer and the second substrate,
  wherein the fourth layer has a traceably measured thickness,
  wherein a lateral dimensional artifact of the calibration standard includes the traceably measured thickness of the at least one fourth layer.

33. The standard of claim 32 wherein the at least one second layer and the at least one fourth layer have different traceably measured thicknesses.

34. The standard of claim 24, wherein the traceably measured thickness is between about one atomic layer and about 2000 nm.

35. The standard of claim 24, wherein the first substrate or the second substrate comprises a semiconductor, quartz or glass.

36. A method for forming a calibration standard, comprising:
  forming at least one first layer upon an upper surface of a first substrate;
  forming at least one second layer upon an upper surface of the at least one first layer;
  determining a thickness of the at least one second layer using a traceable measurement technique;
  forming at least one third layer on an upper surface of a second substrate;
  bonding the second substrate to the first substrate at an interface between an upper surface of the at least one second layer and the at least one third layer;
  cross-sectioning the first substrate, the at least one first layer, the at least one second layer, the at least one third layer and the second substrate in a plane substantially perpendicular or substantially non-perpendicular to at least the upper surface of the first substrate to form a viewing surface of the calibration standard such that a lateral dimensional artifact of the calibration standard comprises the traceably measured thickness of the at least one second layer; and
  selectively removing a portion of the at least one first layer and a portion of the at least one third layer with respect to the second layer such that the at least one first layer forms a topographic feature of the calibration standard.

37. The method of claim 36 wherein the topographic feature comprises a line.

38. The method of claim 36, wherein the traceably measured thickness is between about one atomic layer and about 2000 nm.

39. The method of claim 36 wherein traceably measuring the thickness of the at least one second layer includes the use of thin film metrology, ellipsometry, spectrophotometry, interferometry, profilometry, cross-sectional TEM.

40. The method of claim 36 wherein traceably measuring the thickness of the at least one second layer includes calibrating a measurement system with a standard reference material traceable to a national testing authority.

41. The method of claim 36, further comprising:
  before bonding the first substrate to the second substrate, forming at least one fourth layer and at least one fifth layer such that when the first and second substrates are bonded together,
  the at least one fourth layer is disposed between the at least one third layer and the at least one fifth layer and the at least one fifth layer is disposed between the at least one fourth layer and the second substrate; and
  determining a thickness of the at least one fourth layer using a traceable measurement technique.

* * * * *